US012803729B2

(12) United States Patent
Ma et al.

(10) Patent No.: US 12,803,729 B2
(45) Date of Patent: Nov. 17, 2026

(54) REFERENCE SIGNAL PROCESSING METHOD AND APPARATUS, FIRST COMMUNICATION NODE, AND SECOND COMMUNICATION NODE

(71) Applicant: ZTE CORPORATION, Shenzhen (CN)

(72) Inventors: Yihua Ma, Shenzhen (CN); Zhifeng Yuan, Shenzhen (CN); Liujun Hu, Shenzhen (CN); Zhigang Li, Shenzhen (CN); Weimin Li, Shenzhen (CN)

(73) Assignee: ZTE Corporation, Shenzhen (CN)

(*) Notice: Subject to any disclaimer, the term of this patent is extended or adjusted under 35 U.S.C. 154(b) by 543 days.

(21) Appl. No.: 17/758,706

(22) PCT Filed: Dec. 23, 2020

(86) PCT No.: PCT/CN2020/138469
§ 371 (c)(1),
(2) Date: Jul. 13, 2022

(87) PCT Pub. No.: WO2021/143470
PCT Pub. Date: Jul. 22, 2021

(65) Prior Publication Data
US 2023/0041846 A1 Feb. 9, 2023

(30) Foreign Application Priority Data
Jan. 16, 2020 (CN) ........................ 202010048713.0

(51) Int. Cl.
*H04L 5/00* (2006.01)

(52) U.S. Cl.
CPC .................................. *H04L 5/0048* (2013.01)

(58) Field of Classification Search
CPC ... H04L 5/0048; H04L 5/0073; H04L 5/0037; H04L 27/26035; H04L 27/2613; H04L 27/26136; H04L 1/0041; H04W 72/23
See application file for complete search history.

(56) References Cited

U.S. PATENT DOCUMENTS

| | | | | |
|---|---|---|---|---|
| 2011/0243066 A1* | 10/2011 | Nayeb Nazar ........ | H04L 1/1671 370/328 |
| 2015/0222403 A1* | 8/2015 | Kim ...................... | H04W 72/23 370/329 |

(Continued)

FOREIGN PATENT DOCUMENTS

| | | |
|---|---|---|
| CN | 108282305 A | 7/2018 |
| CN | 110299980 A | 10/2019 |

(Continued)

OTHER PUBLICATIONS

3GPP Technical Specification Group Radio Access Network. "Sequence Hopping and Cyclic-Shift Value Hopping for Uplink Reference Signal in E-UTRA," 3GPP TSG RAN WG1 Meeting #48bis, Mar. 26-30, 2007, pp. 1-4.

(Continued)

*Primary Examiner* — Jamal Javaid
(74) *Attorney, Agent, or Firm* — Vivacqua Crane, PLLC

(57) ABSTRACT

Disclosed are a reference signal processing method and apparatus, a first communication node, and a second communication node. The reference signal processing method may include: creating w sequences, wherein different first communication nodes do not all take a same value of w, and w is a positive integer; generating a reference signal based on the w sequences; and sending the reference signal and a data signal which corresponds to the reference signal.

18 Claims, 7 Drawing Sheets

(56) References Cited

U.S. PATENT DOCUMENTS

| | | | | |
|---|---|---|---|---|
| 2017/0111147 | A1 | 4/2017 | Cao et al. | |
| 2017/0366221 | A1 | 12/2017 | Waheed et al. | |
| 2019/0124693 | A1 | 4/2019 | Nguyen et al. | |
| 2019/0327053 | A1 | 10/2019 | Hu et al. | |
| 2020/0092151 | A1* | 3/2020 | Zarifi | H04J 13/0062 |
| 2020/0154377 | A1* | 5/2020 | Qian | H04W 72/0453 |

FOREIGN PATENT DOCUMENTS

| | | | |
|---|---|---|---|
| CN | 110535602 | A | 12/2019 |
| CN | 111901890 | A | 11/2020 |
| WO | 2017209570 | A1 | 12/2017 |
| WO | 2018059253 | A1 | 4/2018 |
| WO | 2018228492 | A1 | 12/2018 |
| WO | 2020181536 | A1 | 9/2020 |
| WO | 2020198980 | A1 | 10/2020 |

OTHER PUBLICATIONS

International Searching Authority. International Search Report and Written Opinion for PCT Application No. PCT/CN2020/138469 and English translation, mailed Mar. 23, 2021, pp. 1-11.

European Patent Office. Extended European Search Report for EP Application No. 20913606.8, mailed Feb. 15, 2024, pp. 1-8.

Intellectual Property India. Examination Report for IN Application No. 202227045774 and English translation, mailed Dec. 6, 2022, pp. 1-6.

3GPP Technical Specification Group Radio Access Network. "Cell-specific integer sequences for frequency positioning of DL RS on subframe basis," 3GPP TSG RAN WG1 Meeting #47bis, R1-070117, 2007, pp. 1-4.

The State Intellectual Property Office of People's Republic of China. First Office Action and Search Report for CN Application No. 202010048713.0 and English translation, mailed Apr. 21, 2025, pp. 1-25.

European Patent Office. Communication pursuant to Article 94(3) EPC for EP Application No. 20913606.8, mailed Jan. 14, 2026, pp. 1-7.

* cited by examiner

REFERENCE SIGNAL PROCESSING METHOD AND APPARATUS, FIRST COMMUNICATION NODE, AND SECOND COMMUNICATION NODE

CROSS-REFERENCE TO RELATED APPLICATION

This application is a national stage filing under 35 U.S.C. § 371 of international application number PCT/CN2020/138469, filed on Dec. 23, 2020, which claims priority to Chinese patent application No. 202010048713.0 filed on Jan. 16, 2020. The contents of these applications are incorporated herein by reference in their entirety.

TECHNICAL FIELD

The present disclosure relates to the field of communications, for example, to a reference signal processing method, an apparatus, a first communication node, and a second communication node.

BACKGROUND

In a massive access scenario, for example, a random access scenario, each user selects a sequence from a sequence pool as a reference signal. When multiple users select a same reference signal, a collision occurs. If a reference signal collision probability of one user is the same with that of any other user, it is impossible to provide differentiated services for different users.

SUMMARY

The present disclosure provides a reference signal processing method, an apparatus, a first communication node, and a second communication node.

An embodiment of the present disclosure provides a reference signal processing method applied to a first communication node, which may include: creating w sequences, where different first communication nodes do not all take a same value of w, and w is a positive integer; generating a reference signal based on the w sequences; and sending the reference signal and a corresponding data signal.

A further embodiment of the present disclosure provides a reference signal processing method applied to a second communication node, which may include: receiving reference signals and data signals of multiple first communication nodes; performing demodulation, based on at least one sequence for generating a target reference signal in the reference signals, to obtain a data signal which corresponds to the target reference signal; determining to create w sequences for the target reference signal based on the data signal; and performing interference cancellation based on the w sequences, to determine a next target reference signal until cancellation is completed for all the reference signals.

A further embodiment of the present disclosure provides a reference signal processing apparatus configured at a first communication node, which may include: a creation module configured to create w sequences, where different first communication nodes do not all take a same value of w, and w is a positive integer; a generation module configured to generate a reference signal based on the w sequences; and a sending module configured to send the reference signal and a corresponding data signal.

A further embodiment of the present disclosure provides a reference signal processing apparatus configured at a second communication node, which may include: a receiving module configured to receive reference signals and data signals of multiple first communication nodes; a demodulation module configured to perform demodulation, based on at least one sequence for generating a target reference signal in the reference signals, to obtain a data signal which corresponds to the target reference signal; a determination module configured to determine to create w sequences for the target reference signal based on the data signal; and an interference cancellation module configured to perform interference cancellation based on the w sequences, to determine a next target reference signal until cancellation is completed for all the reference signals.

A further embodiment of the present disclosure provides a first communication node, which may include: at least one processor; and a storage apparatus, configured to store at least one program, where the at least one program, when executed by the at least one processor, causes the at least one processor to implement a reference signal processing method applied to the first communication node.

A further embodiment of the present disclosure provides a second communication node, which may include: at least one processor; and a storage apparatus, configured to store at least one program, where the at least one program, when executed by the at least one processor, causes the at least one processor to implement a reference signal processing method applied to the second communication node.

A further embodiment of the present disclosure provides a non-transitory computer-readable storage medium storing a computer program which, when executed by a processor, causes the processor to implement the reference signal processing method according to any of the embodiments of the present disclosure.

DETAILED DESCRIPTION

The embodiments of the present disclosure will be described below with reference to the accompanying drawings.

The steps shown in the flowcharts of the drawings may be performed in a computer system, such as with a set of computer-executable instructions. Moreover, although a logical order is shown in the flowcharts, the steps shown or described may be performed, in some cases, in a different order from the order shown or described herein.

Figure 1:
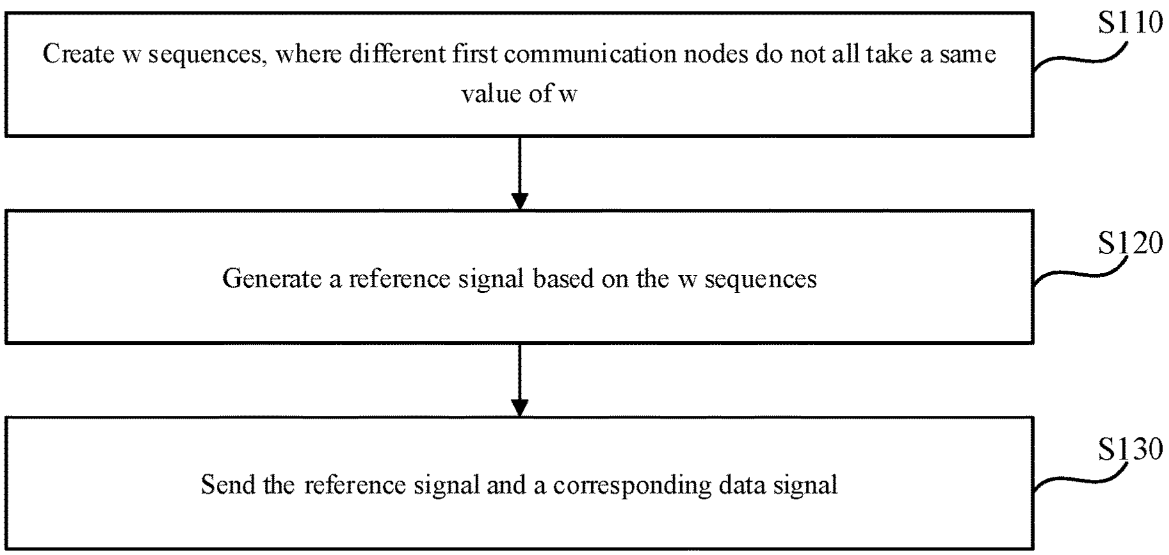
FIG. 1 is a flowchart of a reference signal processing method provided by the present disclosure.

In an implementation, FIG. 1 is a flowchart of a reference signal processing method provided by the present disclosure. The method can be applied to reduce a probability of collision between reference signals, and can be executed by a reference signal processing apparatus, which can be implemented by software and/or hardware and integrated on a first communication node. The first communication node may be any suitable type of user equipment.

As shown in FIG. 1, the reference signal processing method provided in the present disclosure includes S110, S120, and S130.

At S110, w sequences are created, where different first communication nodes do not all take a same value of w.

To reduce a probability of collision between reference signals, w sequences are first created in the present disclosure, each sequence being used to generate a reference signal. The value of w may be determined based on data information or a transmission priority or may be indicated by a base station, which is not specified here. The w sequences may be created from a sequence pool based on sequence indication information and/or a sequence number offset. The sequence number offset and the sequence indication information may be determined by the data information. The “w” is a positive integer.

Some or all of the different first communication nodes take a same value of w to reduce a probability of collision between reference signals.

At S120, a reference signal is generated based on the w sequences.

After creating the w sequences, this step may generate the reference signal based on each sequence. A generation means is not specified here, for example, may use a superposition manner or a manner of mapping to different time-frequency resources. The superposition manner may be realized by sequence addition.

At S130, the reference signal and a corresponding data signal are sent.

After generating the reference signal, the step can send the reference signal and the corresponding data signal to a second communication node.

The present disclosure provides a reference signal processing method applied to the first communication node, including: creating w sequences, where different first communication nodes do not all take a same value of w; generating a reference signal based on the w sequences; and sending the reference signal and a corresponding data signal. Using this method, the probability of collision between reference signals is effectively reduced.

The following provides illustrative descriptions for the present disclosure The reference signal generation method provided in the present disclosure may be considered as a reference signal generation method with a variable quantity of generated sequences. In a conventional communications system, (1) a probability of collision between reference signals for all users is consistent, which is not an optimal setting for a Successive Interference Cancellation (SIC) process; (2) a probability of collision between reference signals for different users is consistent, making it impossible to provide differentiated services for the different users.

The present disclosure deals with massive access. In a conventional random access mode, each user selects a sequence from a sequence pool as a reference signal. When multiple users select a same reference signal, a collision occurs. This causes the following results: (1) if each user sends the same number of sequences, a reference signal collision probability is the same, which is not an optimal setting for the SIC process; (2) priorities of multiple users are the same, making an urgent service unable to have a higher priority.

The present disclosure provides a reference signal generation manner, which improves a success rate of random access and provides differentiated services for access with different requirements. The reference signal in the present disclosure may be generated by w sequences in one sequence pool. Different users may have different values of w to reduce a collision probability.

Figure 1A:
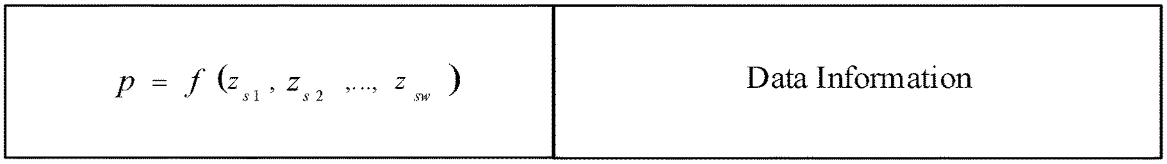
FIG. 1*a* is a schematic diagram of a transmission frame provided by the present disclosure.

FIG. 1*a* is a schematic diagram of a transmission frame provided by the present disclosure. Referring to FIG. 1*a*, the reference signal may be generated by w non-repeated sequences and different users may have different values of w.

In Example 1, the sequence quantity w for multiple users (namely, the first communication nodes) to generate a reference signal may be generated by a probability distribution.

The probability distribution may be expressed as w~f (w), w=1, 2, 3, satisfying $$\sum_{w=1}^{+\infty} f(w) = 1.$$

For a user, a new value of w may be generated by f(w) in each transmission, or a value of w generated by using f(w) once is reused for output in multiple transmissions.

Table 1 is a table of correspondences between w and f(w). Referring to Table 1, a User Equipment (UE) determines w based on the probability distribution. For example, a UE 1 determines $w_1=2$ based on a value of 0.5 of f(w). Here, P is f(w). Each UE determines a value of respective w based on the correspondences between w and f(w) shown in FIG. 1*b*. Here, the correspondences between w and f(w) may be prestored in each UE.

TABLE 1

| Table of correspondences between w and f(w) | | | | |
|---|---|---|---|---|
| w | 2 | 3 | 4 | Others |
| p | 0.5 | 0.28 | 0.22 | 0 |

In Example 2, the sequence quantity w for multiple users (namely, the first communication nodes) to generate a reference signal is determined by a priority of a current transmission for each user. The manner of determining the transmission priority is not specified and may be determined by the first communication node or indicated by the second communication node.

A user may update the priority for every transmission, update the priority every multiple transmissions, or specify a fixed priority.

Table 2 is a table of correspondences between w and transmission priorities. Referring to Table 2, as each UE prestores the correspondences between priorities and w, each UE determines its own w based on a priority of the current transmission and the correspondences between priorities and w. If the priority of the current transmission for the UE 1 is 1, w for the UE 1 is 4.

TABLE 2

| Table of correspondences between w and transmission priorities | | | |
|---|---|---|---|
| Priority | 1 | 2 | 3 |
| w | 4 | 2 | 1 |

In Example 3, the sequence quantity w for multiple users to generate a reference signal may be determined by data information for each user. Table 3 is a table of correspondences between w and symbols. Referring to Table 3, w has three values, which need to be indicated by a 2-bit symbol x. The 2-bit symbol x may be obtained by mapping from an information bit existing before cyclic redundancy check (CRC) attachment; a bit existing after CRC attachment and before channel coding; or a codeword existing after channel coding. In other words, w may be determined by using a 2-bit symbol (namely, x) from the information bit existing before CRC attachment, the bit existing after CRC attachment and before channel coding, or the codeword existing after channel coding. The UE may determine w based on a value of x. For example, the UE takes a 2-bit symbol as x from the information bit existing before CRC attachment, and then determines corresponding w based on Table 3. If the value of x for the UE 1 is 01, the value of w for the UE 1 is 3.

TABLE 3

| Table of correspondences between w and symbols | | | |
|---|---|---|---|
| x | 00/11 | 01 | 10 |
| w | 2 | 3 | 4 |

In Example 4, the sequence quantity w for multiple users to generate a reference signal is determined by identifier information of the first communication node, for example, a UE Identifier (ID). In this case, the UE ID has to be included in transmission information. This embodiment may be considered as a special case for Example 3, that is, the user's data information includes the UE ID and w is determined by the UE ID.

Table 4 is a table of correspondences between w and identifier information. Referring to Table 4, each UE may pr-store the table of correspondences between w and identifier information, and each UE determines corresponding w based on respective identifier information.

TABLE 4

| Table of correspondences between w and identifier information | | | | | |
|---|---|---|---|---|---|
| Identifier information | 1 | 2 | 3 | 4 | . . . |
| w | 2 | 3 | 4 | 2 | . . . |

Figure 1B:
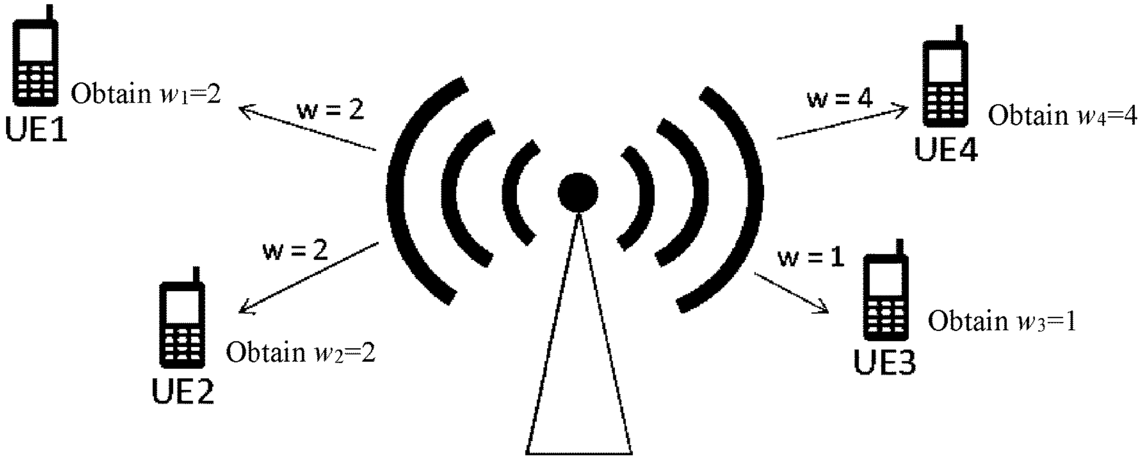
FIG. 1*b* is a schematic diagram of a second communication node indicating a value of w for a first communication node provided by the present disclosure.

In Example 5, the sequence quantity w for multiple users to generate a reference signal is specified by the base station. This manner may also be considered as a specific implementation of Example 4, that is, the base station side associates the UE ID with w and notifies the UE of the association. After obtaining the UE ID through demodulation, the base station may know a value of corresponding w. FIG. 1*b* is a schematic diagram of a second communication node indicating a value of w for a first communication node provided by the present disclosure. Referring to FIG. 1*b*, the second communication node is the base station, which indicates a value of corresponding w to each UE, for example, indicates w=2 to the UE 1.

In Example 6, after w is determined, the user, namely, the first communication node selects w sequences and generates a reference signal based on the w sequences. The reference signal may be generated by superimposing multiple sequences.

Figure 1C:
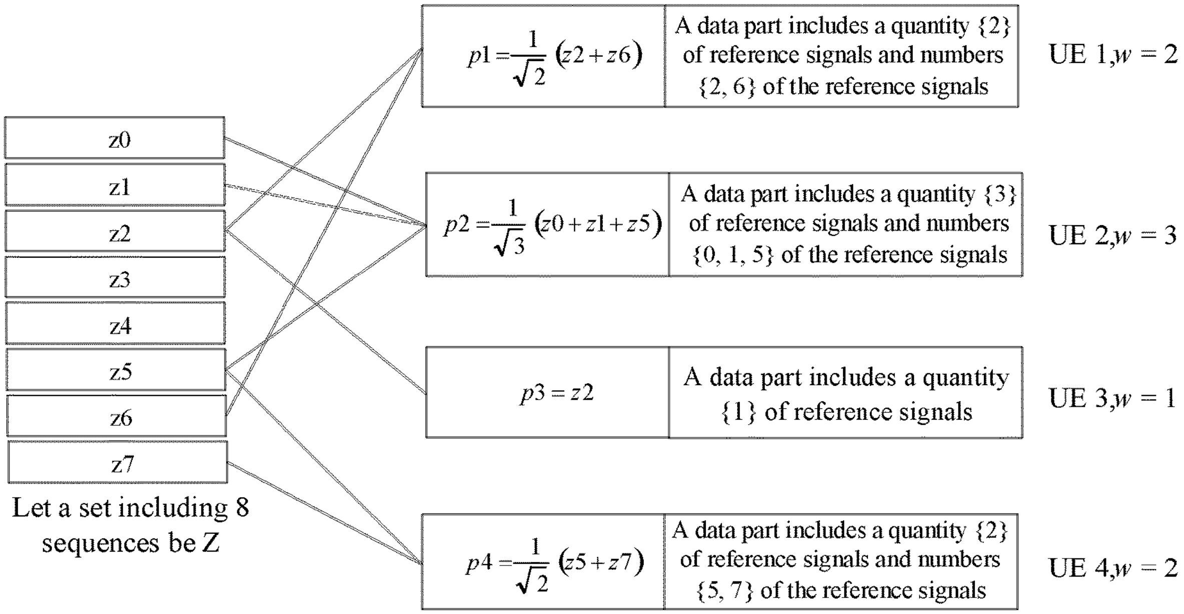
FIG. 1*c* is a schematic diagram of generating a reference signal provided by the present disclosure.

FIG. 1*c* is a schematic diagram of generating a reference signal provided by the present disclosure. Referring to FIG. 1*c*, a sequence pool includes 8 sequences: z0, z1, . . . z7. Each UE selects w sequences from the sequence pool and generates a reference signal by superimposing the sequences. For example, the UE 1 selects sequences z2 and z6 to generate the reference signal.

In Example 7, after w is determined, the user selects w sequences and generates a reference signal based on the w sequences. The reference signal may be generated by transmitting multiple sequences at different time-frequency resource locations.

Figure 1D:
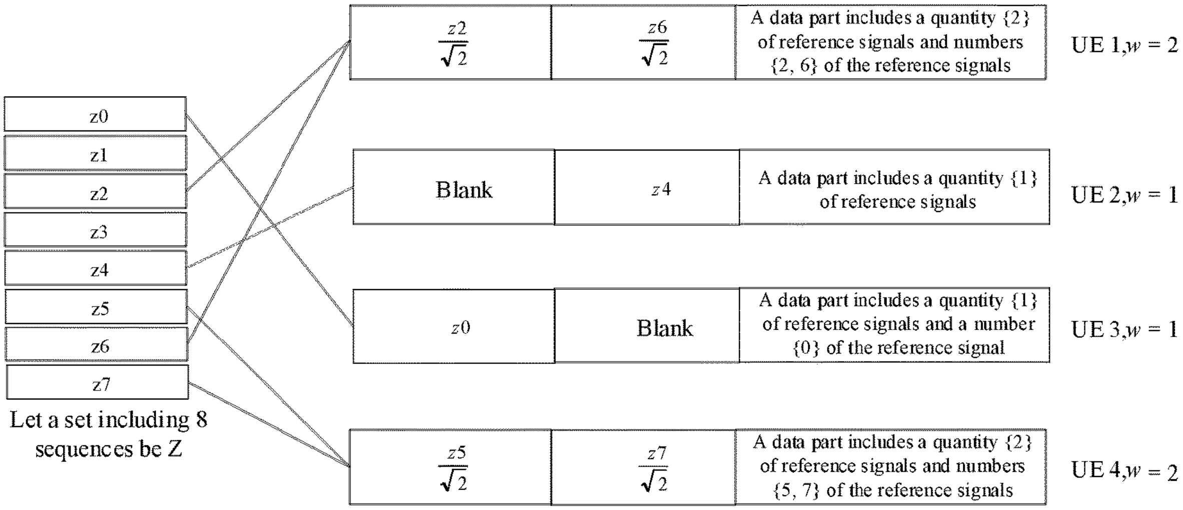
FIG. 1*d* is a schematic diagram of another manner of generating a reference signal provided by the present disclosure.

FIG. 1*d* is a schematic diagram of another manner of generating a reference signal provided by the present disclosure. Referring to FIG. 1*d*, a sequence pool includes 8 sequences: z0, z1, . . . , z7. Each UE selects w sequences from the sequence pool and generates a reference signal by mapping the sequences to different time-frequency resource locations. When a value of w is 1, the data part may include only value information of w or may include the value information of w and sequence number indication information.

In Example 8, the data information needs to include information indicating the w sequences. As w may vary between different users in the present disclosure, the information indicating the w sequences included in the data information includes but is not limited to one or a combination of the following: information of a sequence count w (namely, the value information of w), the information indicating the w sequences (namely, the sequence indication information), and offset information for the w sequences (namely, the sequence number offset). Assuming that there are M values of w, $m=\lceil \log_2(M) \rceil$ bits are required for indication. Assuming that there are N sequences in the sequence set, $n=\lceil \log_2(N) \rceil$ bits are required for indication. In one manner, one piece of m-bit information about the value of w and w pieces of n-bit information about a number of the reference signal are included. Here, the reference signal in this embodiment is a pilot, and the data information in this embodiment is the information bit existing before CRC attachment.

Figure 1E:
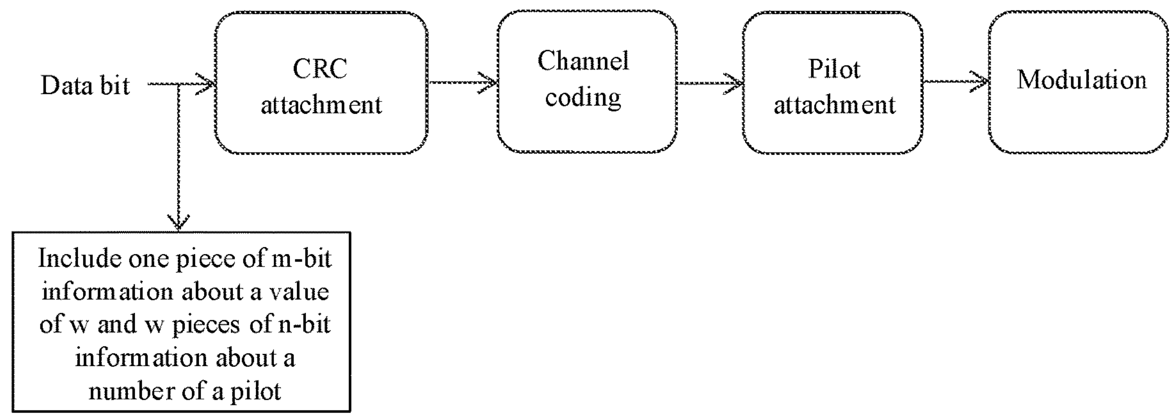
FIG. 1*e* is a schematic diagram of data information including sequence information for reference signal generation provided by the present disclosure.
Figure 1F:
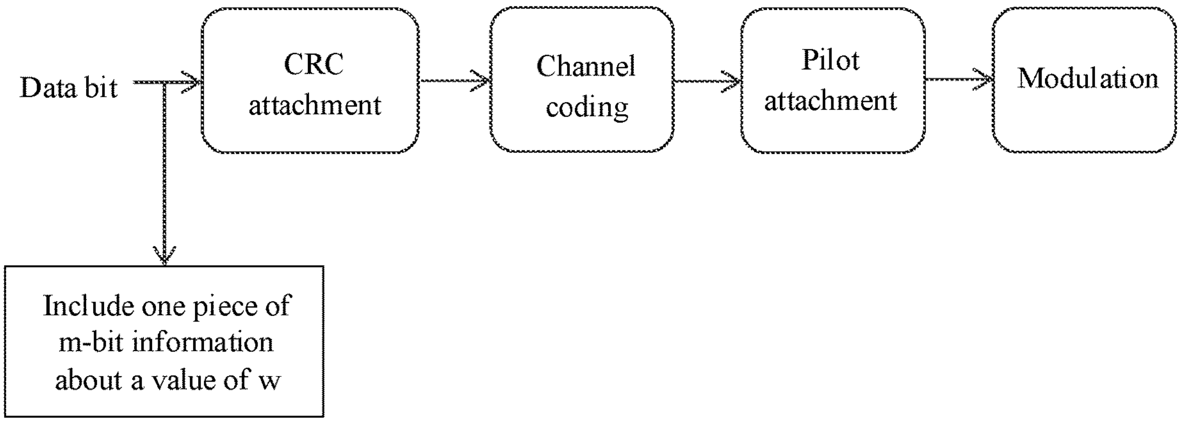
FIG. 1*f* is another schematic diagram of data information including sequence information for reference signal generation provided by the present disclosure.
Figure 1G:
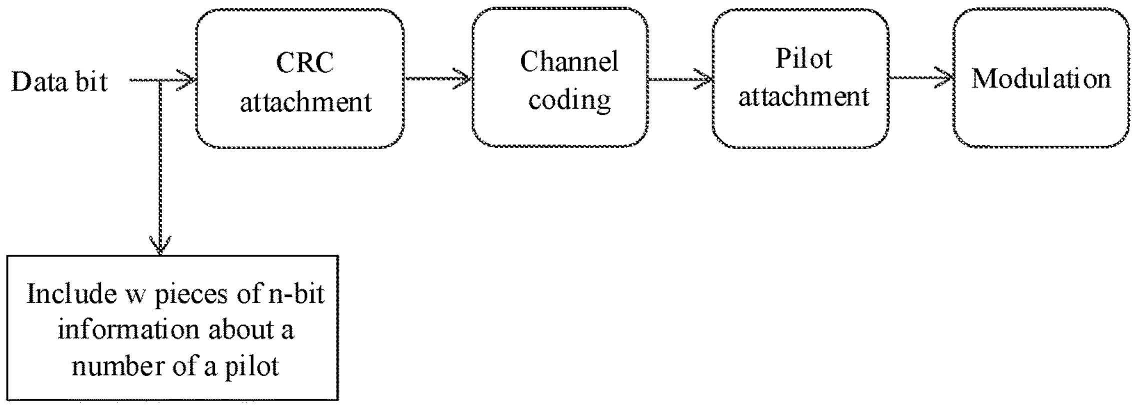
FIG. 1*g* is another schematic diagram of data information including sequence information for reference signal generation provided by the present disclosure.

FIG. 1*e* is a schematic diagram of data information including sequence information for reference signal generation provided by the present disclosure. FIG. 1*f* is another schematic diagram of data information including sequence information for reference signal generation provided by the present disclosure. FIG. 1*g* is another schematic diagram of data information including sequence information for reference signal generation provided by the present disclosure. Referring to FIG. 1*e*, FIG. 1*f*, and FIG. 1*g*, the information bit existing before CRC attachment may include sequence information for reference signal generation, which includes one of the following: one piece of value information about the value of w, namely, m-bit information; and w pieces of sequence number indication information, namely, w pieces of n-bit information about a value of a pilot sequence.

In Example 9, the data information needs to include information indicating the w sequences. As w may vary between different users in the present disclosure, the information indicating the w sequences included in the data information includes but is not limited to one or a combination of the following: the information of the sequence count w, the information indicating the w sequences, and the offset information for the w sequences (namely, the sequence number offset).

Assuming that there are 2 values of w, one bit is required for indication. Assuming that there are N sequences in the sequence set and an offset of two sequences ranges from (−N+1) to (N−1), $n=\lceil \log_2(2N-1) \rceil$ bits are required for indication. In one manner, one piece of m-bit information about the value of w and (w−1) pieces of n-bit information about a sequence number offset of the reference signal are included. Here, the reference signal in this embodiment is a demodulation reference signal (DMRS), and the data information in this embodiment is the bit existing after CRC attachment and before channel coding.

Figure 1H:
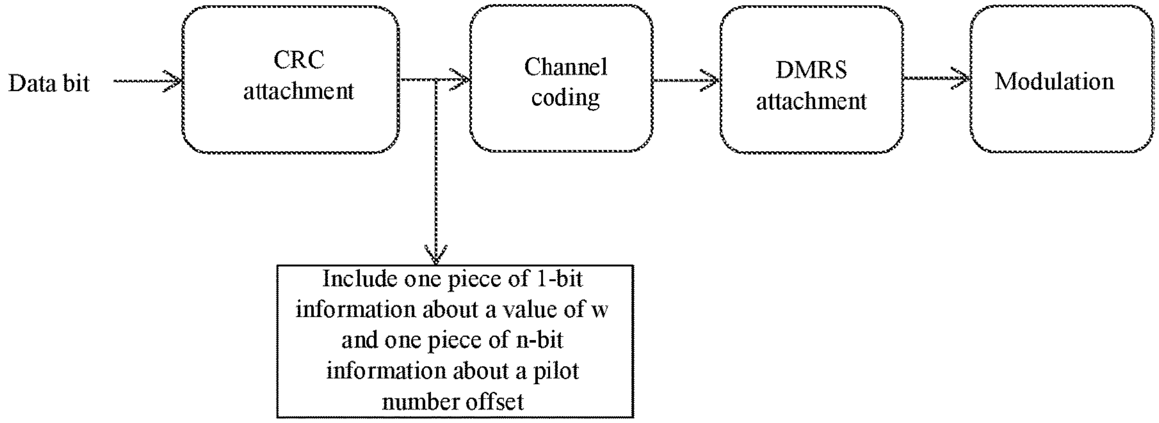
FIG. 1*h* is another schematic diagram of data information including sequence information for reference signal generation provided by the present disclosure.
Figure 1I:
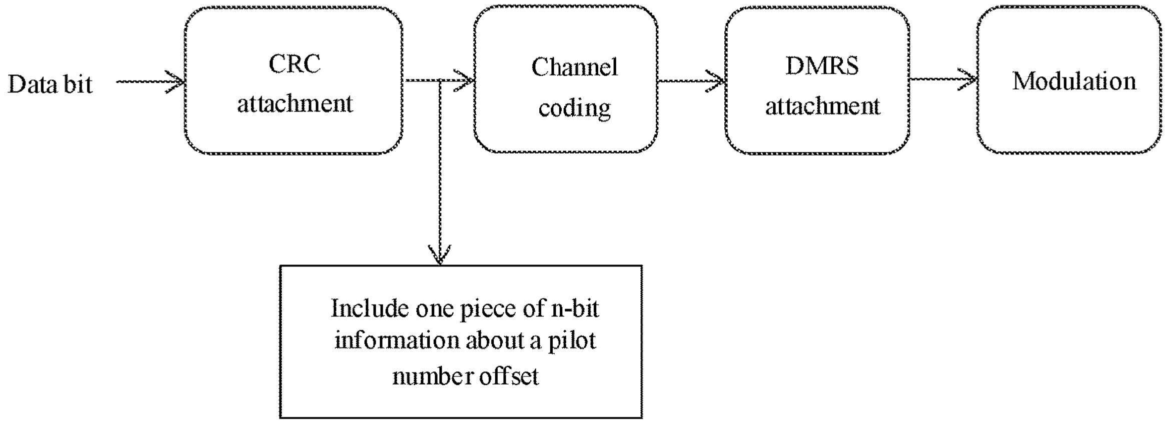
FIG. 1*i* is another schematic diagram of data information including sequence information for reference signal generation provided by the present disclosure.

FIG. 1*h* is another schematic diagram of data information including sequence information for reference signal generation provided by the present disclosure. FIG. 1*i* is another schematic diagram of data information including sequence information for reference signal generation provided by the present disclosure. Referring to FIG. 1*h* and FIG. 1*i*, the data information may be determined based on the bit existing after CRC attachment and before channel coding. The data information includes: one piece of value information about the value of w; and any one of the (w−1) sequence number offsets, that is, w pieces of n-bit information about a pilot number offset. When the value of w is 2, the data information includes one piece of n-bit information about the pilot number offset and one piece of 1-bit information about the value of w; or the data information includes only one piece of n-bit information about the pilot number offset.

In Example 10, the data information needs to include information indicating the w sequences. As w may vary between different users in the present disclosure, the information indicating the w sequences included in the data information includes but is not limited to one or a combination of the following: the information of the sequence count w, the information indicating the w sequences, and the offset information for the w sequences.

Assuming that there are N sequences in the sequence set, $n=\lceil \log_2(N) \rceil$ bits are required for indication. In one manner, v pieces of n-bit information about the number of the reference signal are included. Here, each user takes a same value of v. In this way, w can be determined by a quantity of non-repeated numbers from the v pieces of n-bit number information, and numbers of the w sequences can be determined by a set of non-repeated sequences. Here, the reference signal in this embodiment is a DMRS, and the data information in this embodiment is the information bit existing before CRC attachment.

Figure 1J:
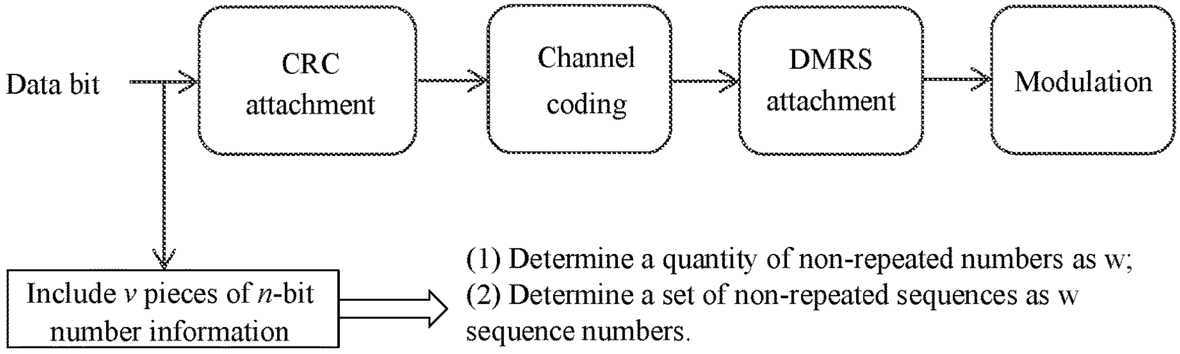
FIG. 1*j* is another schematic diagram of data information including sequence information for reference signal generation provided by the present disclosure.

FIG. 1*j* is another schematic diagram of data information including sequence information for reference signal generation provided by the present disclosure. Referring to 1*j*, the data information may include v pieces of n-bit number information in the information bit existing before CRC attachment. Each first communication node has a same value of n. The quantity of non-repeated numbers in the v pieces of n-bit number information is determined as w, and a set of non-repeated numbers is determined as numbers of the w sequences.

In Example 11, the data information needs to include information indicating the w sequences. As w may vary between different users in the present disclosure, the information indicating the w sequences included in the data information includes but is not limited to one or a combination of the following: the information of the sequence count w, the information indicating the w sequences, and the offset information for the w sequences. Assuming that there are V values of v, $m=\lceil \log_2(V) \rceil$ bits are required for indication. Assuming that there are N sequences in the sequence set, $n=\lceil \log_2(N) \rceil$ bits are required for indication. In one manner, one piece of m-bit information about the value of v and v pieces of n-bit information about a number of the reference signal are included. In this way, w can be determined by a quantity of non-repeated numbers from the v pieces of n-bit number information, and numbers of the w sequences can be determined by a set of non-repeated sequences. Here, the reference signal in this embodiment is a preamble (Preamble), and the data information in this embodiment is the codeword existing after channel coding.

Figure 1K:
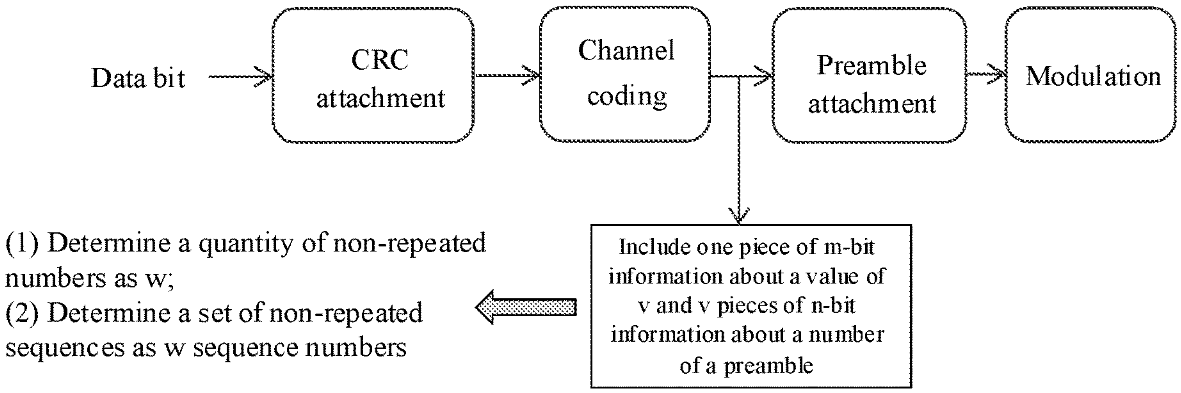
FIG. 1*k* is another schematic diagram of data information including sequence information for reference signal generation provided by the present disclosure.

FIG. 1*k* is another schematic diagram of data information including sequence information for reference signal generation provided by the present disclosure. Referring to FIG. 1*k*, the data information may include one piece of m-bit information about the value of v and v pieces of n-bit information about preamble number information in the codeword existing after channel coding. The value of v is not fixed for each first communication node in this example, and there may be V values. In the present disclosure, the quantity of non-repeated numbers in the v pieces of n-bit information about the number is determined as w, and the set of non-repeated sequences is determined as the information indicating the w sequences, that is, sequence numbers.

In Example 12, the data information needs to include information indicating the w sequences. As w may vary between different users in the present disclosure, the information indicating the w sequences included in the data information includes but is not limited to one or a combination of the following: the information of the sequence count w, the information indicating the w sequences, and the offset information for the w sequences. Assuming that there are N sequences in the sequence set, $n=\lceil \log_2(N) \rceil$ bits are required for indication. In one manner, w pieces of n-bit number information and one q-bit termination sequence.

Here, as the reference signal in this embodiment is a preamble or a DMRS, and a quantity of sequences and numbers for generating the preamble and DMRS are correlated, the data information in this embodiment is the bit existing after CRC attachment and before channel coding; as the quantity of sequences and numbers for generating the preamble and DMRS are correlated, the data information in this embodiment is the codeword existing after channel coding.

Figure 1L:
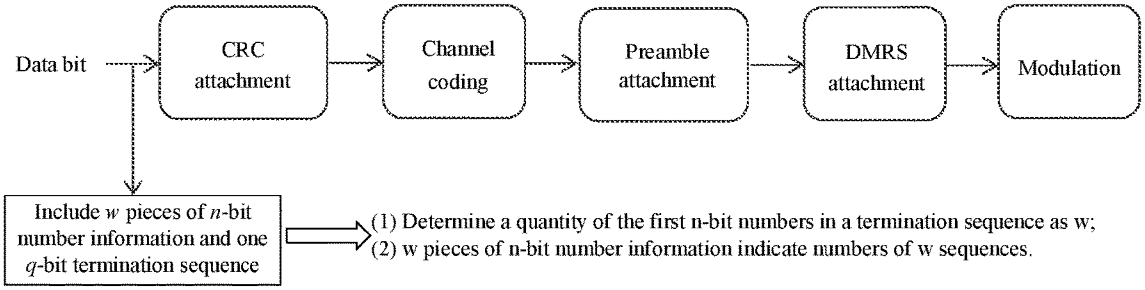
FIG. 1*l* is another schematic diagram of data information including sequence information for reference signal generation provided by the present disclosure.

FIG. 1*l* is another schematic diagram of data information including sequence information for reference signal generation provided by the present disclosure. Referring to FIG. 1*l*, the same as that in Example 10 and that in Example 11, w in the present disclosure is determined by computation. In this example, the data information may include w pieces of n-bit number information and one q-bit termination sequence included in the information bit existing before CRC attachment. A quantity indicated by the first n-bit numbers in the termination sequence is determined as w, and w pieces of n-bit number information indicate the information indicating the w sequences.

In Example 13, the data information needs to include information indicating the w sequences. As w may vary between different users in the present disclosure, the information indicating the w sequences included in the data information includes but is not limited to one or a combination of the following: the information of the sequence count w, the information indicating the w sequences, and the offset information for the w sequences. Assuming that there are N sequences in the sequence set, $n=\lceil \log_2(N) \rceil$ bits are required for indication. In one manner, w pieces of n-bit number information and one q-bit termination sequence. Here, as the reference signal in this embodiment is a preamble or a DMRS, and a quantity of sequences and numbers for generating the preamble and DMRS are unrelated, the data information in this embodiment is the bit existing after CRC attachment and before channel coding.

Figure 1M:
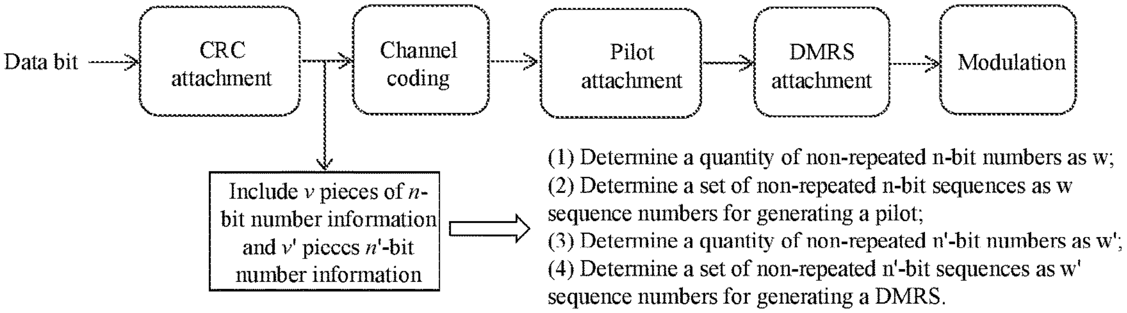
FIG. 1*m* is another schematic diagram of data information including sequence information for reference signal generation provided by the present disclosure.

FIG. 1*m* is another schematic diagram of data information including sequence information for reference signal generation provided by the present disclosure. Referring to FIG. 1*m*, as a quantity of sequences and numbers are unrelated, v pieces of n-bit number information and v' pieces of n'-bit number information are extracted as data information from the bits after CRC attachment and before channel coding, and w and w sequence numbers are determined based on the v pieces of n-bit number information. Based on v' pieces of n'-bit number information, w' and w' pieces of sequence numbers are determined to serve as sequence information respectively for generation of the preamble and DMRS.

In Example 14, the present disclosure may incorporate a partial scrambling technology. The partial scrambling technology can improve randomness of data of different users in unscheduled transmission, thereby improving demodulation performance and estimation performance of Data-pilot. The present disclosure can perform partial scrambling on the information bit existing before CRC attachment or the bit existing after CRC attachment and before channel coding.

On the basis of the foregoing embodiment, a modified embodiment of the foregoing embodiment is proposed. For simplified description, only differences from the foregoing embodiment are described in the modified embodiment.

In an embodiment, the value of w is indicated by a base station or determined according to one of the following: a discrete probability distribution; a transmission priority; or data information.

w may have a correspondence with the transmission priority and may be determined based on a corresponding transmission priority. w may be directly indicated by the data information or obtained by computation on the data information. For example, the data information may include v pieces of n-bit sequence information. the data information may include w pieces of n-bit number information and one q-bit termination sequence.

In an embodiment, at least one of the following information of the w sequences is determined by data information: sequence indication information; or a sequence number offset.

The sequence number indication information is used to indicate a number of a sequence to identify the sequence. The sequence number offset may be an offset of a sequence number. Based on the number and the sequence number offset of a sequence, the sequence number indication information of the w sequences can be determined.

In an embodiment, the data information is an information bit or a codeword existing before modulation by a first communication node.

In an embodiment, the data information is an information bit existing before CRC attachment, a bit existing after CRC attachment and before channel coding, or a codeword existing after channel coding.

In an embodiment, the data information includes identifier information of the first communication node.

w may have a correspondence with identifier information of the first communication node. After the identifier information of the first communication node is determined, corresponding w can be determined. The identifier information is used to identify the first communication nodes to distinguish between the first communication nodes.

In an embodiment, a bit count of the data information is determined based on a value range of w, which is indicated by the data information. For a specific example, refer to Example 3 of the present disclosure. w may be directly indicated by the data information, and the bit count of the data information may be determined based on the value range of w, so that there is a correspondence between different values of the data information and each value of w.

In an embodiment, the data signal includes at least one of the following: value information of w; sequence number indication information; or a sequence number offset, and the data signal is determined based on the data information.

In an embodiment, the data information includes at least one of the following: one piece of value information of w; or w pieces of sequence indication information, which is used to indicate w sequences. For a specific example, refer to Example 8 of the present disclosure. The w sequences are determined by using the w pieces of sequence indication information, and a value of w is determined based on the value information of w.

In an embodiment, the data information includes at least one of the following: one piece of value information of w; or (w−1) sequence number offsets. For a specific example, refer to Example 9 of the present disclosure. The value of w is determined based on the value information of w, and a number of a sequence for generating reference information is determined based on the (w−1) sequence number offsets and a sequence number of successfully detected data. The number offset is an offset of a sequence number.

In an embodiment, when the different first communication nodes take a same value of v, the data information includes v pieces of n-bit information, or when the different first communication nodes take different values of v, the data information includes v pieces of n-bit information and value information of v; and an amount of non-repeated information in the v pieces of n-bit information is w. The non-repeated information in the v pieces of n-bit information is determined as the sequence number indication information, where n is a positive integer, and v is a positive integer greater than or equal to w for any first communication node. For a specific example, refer to Example 10 and Example 11 of the present disclosure. In this embodiment, the value of w and the sequence number indication information are obtained through data information computation. The amount of non-repeated information in the v pieces of n-bit information is determined w, and non-repeated n-bit information is determined as the sequence number indication information. A value of n is determined based on a quantity of sequences included in a sequence set which obtains the w sequences.

In an embodiment, the data information includes: w pieces of n-bit information and one q-bit termination sequence, where a value of n is determined based on the quantity of sequences included in a sequence set which obtains the w sequences, q being a positive integer; and a quantity indicated by the first n bits of the termination sequence is w, and the w pieces of n-bit information indicate sequence number indication information of the w sequences. For a specific example, refer to Example 12.

In an embodiment, the method further includes: performing partial scrambling on the information bit existing before the CRC or the information bit existing after the CRC.

In an embodiment, the reference signal includes at least one of the following: a preamble; a pilot; or a DMRS.

In an embodiment, generating a reference signal based on the w sequence includes: generating the reference signal by superimposing the w sequences; or generating the reference signal by mapping the w sequences to different time-frequency resources.

Figure 2:
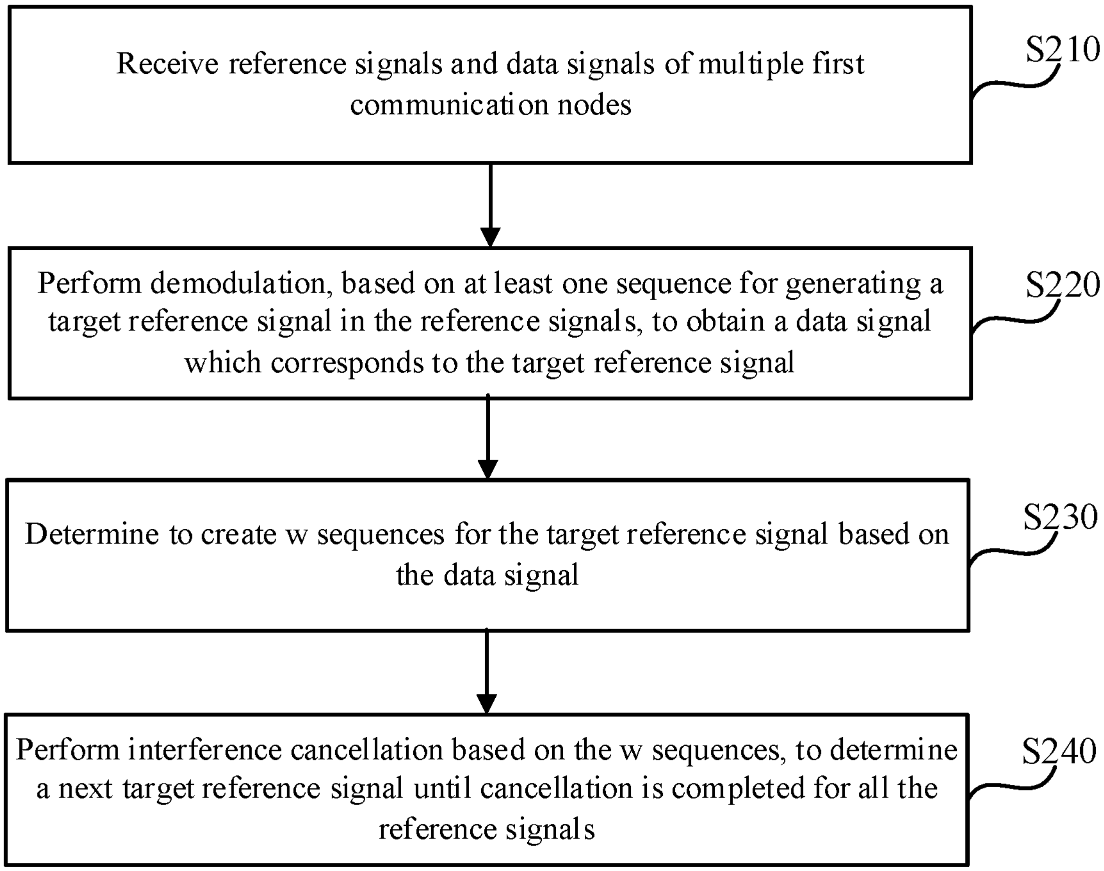
FIG. 2 is a flowchart of a reference signal processing method provided by the present disclosure.

The present disclosure further provides a reference signal processing method. FIG. 2 is a flowchart of a reference signal processing method provided by the present disclosure. The method can be applied to reduce a probability of collision between reference signals, and can be executed by a reference signal processing apparatus, which can be implemented by software and/or hardware and integrated on a second communication node. The second communication node may be a base station.

As shown in FIG. 2, the reference signal processing method includes S210, S220, and S230.

At S210, reference signals and data signals of multiple first communication nodes are received.

At S220, based on at least one sequence for generating a target reference signal in the reference signals, demodulation is performed to obtain a data signal which corresponds to the target reference signal.

The present disclosure may search for the target reference signal to determine at least one sequence for generating the target reference signal. The target reference signal is a reference signal for the current processing. The at least one sequence for generating the target reference signal is used to search for the data signal to obtain a data signal corresponding to the target reference signal.

At S230, it is determined to create w sequences for the target reference signal based on the data signal.

After determining the data signal, information included in the data signal is extracted. The data signal includes at least one of the following: value information of w; sequence number indication information; or a sequence number offset, and the data signal is determined based on the data information. The data signal may be a signal sent to the second communication node after data information is processed. Different data information corresponds to different processing, which is not specified here.

After determining information included in the data signal, w sequences can be determined based on various pieces of information in a same manner as the first communication node.

At S240, interference cancellation is performed based on the w sequences, to determine a next target reference signal until cancellation is completed for all the reference signals.

After determining the w sequences, interference cancellation in this step may be performed, for example, cancel the target reference signal and the data signal corresponding to the w sequences, or cancel only the data signal corresponding to the w sequences. After the cancellation operation is executed, remaining reference signals may continue to be searched for, to obtain a next target reference signal. Then, S220 is performed.

This embodiment has not been described in detail. Refer to the above-mentioned embodiment for more details, which are not provided here.

The present disclosure provides a reference signal processing method applied to a second communication node, including: receiving reference signals and data signals of multiple first communication nodes; performing demodulation, based on at least one sequence for generating a target reference signal in the reference signals, to obtain a data signal which corresponds to the target reference signal; and determining to create w sequences for the target reference signal based on the data signal. Using this method, a probability of collision between reference signals is effectively reduced.

On the basis of the foregoing embodiment, a modified embodiment of the foregoing embodiment is proposed. For simplified description, only differences from the foregoing embodiment are described in the modified embodiment.

In an embodiment, the method further includes sending a value of w, for example, sending the value of w to a first communication node.

In an embodiment, the value of w is determined according to one of the following: a discrete probability distribution; a transmission priority; or data information.

In an embodiment, at least one of the following information of the w sequences is determined by data information: sequence indication information; or a sequence number offset.

In an embodiment, the data information is an information bit or a codeword existing before modulation by a first communication node.

In an embodiment, the data information is an information bit existing before CRC attachment, a bit existing after CRC attachment and before channel coding, or a codeword existing after channel coding.

In an embodiment, the data information includes identifier information of the first communication node.

In an embodiment, a bit count of the data information is determined based on a value range of w, which is indicated by the data information.

In an embodiment, the data signal includes at least one of the following: value information of w; sequence number indication information; or a sequence number offset, and the data signal is determined based on the data information.

In an embodiment, the data information includes at least one of the following: one piece of value information of w; or w pieces of sequence indication information, which is used to indicate the w sequences.

In an embodiment, the data information includes at least one of the following: one piece of value information of w; or (w−1) sequence number offsets.

In an embodiment, when different first communication nodes take a same value of v, the data information includes v pieces of n-bit information, or when different first communication nodes take different values of v, the data information includes v pieces of n-bit information and value information of v; and an amount of non-repeated information in the v pieces of n-bit information is w. The non-repeated information in the v pieces of n-bit information is determined as the sequence number indication information.

In an embodiment, the data information includes: w pieces of n-bit information and one q-bit termination sequence, where a value of n is determined based on a quantity of sequences included in a sequence set which obtains the w sequences; and a quantity indicated by the first n bits of the termination sequence is w, and the w pieces of n-bit information indicate sequence number indication information of the w sequences.

In an embodiment, partial scrambling is performed on the information bit existing before the CRC or the information bit existing after the CRC.

In an embodiment, the reference signal includes at least one of the following: a preamble; a pilot; or a DMRS.

Figure 3:
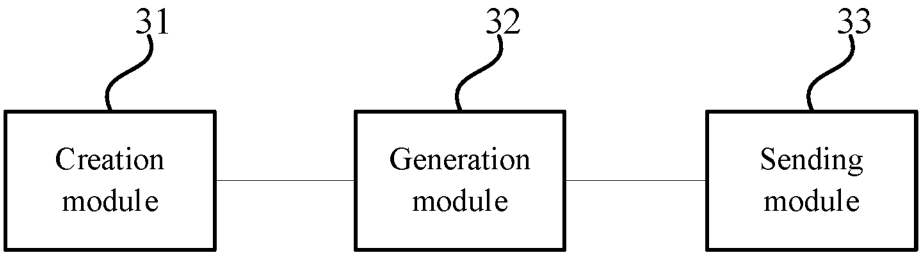
FIG. 3 is a schematic diagram of a reference signal processing apparatus provided by the present disclosure.

The present disclosure provides a reference signal processing apparatus. FIG. 3 is a schematic diagram of a reference signal processing apparatus provided in the present disclosure. The apparatus is disposed in a first communication node. Referring to FIG. 3, the apparatus includes: a creation module 31 configured to create w sequences, where different first communication nodes do not all take a same value of w, and w is a positive integer; a generation module 32 configured to generate a reference signal based on the w sequences; and a sending module 33 configured to send the reference signal and a corresponding data signal.

The reference signal processing apparatus provided in this embodiment is configured to implement the reference signal processing method in the embodiment shown in FIG. 1. The implementation principle and technical effects of the reference signal processing apparatus provided in this embodiment are similar to those of the reference signal processing method in the embodiment shown in FIG. 1. Details are not described herein again.

On the basis of the foregoing embodiment, a modified embodiment of the foregoing embodiment is proposed. For simplified description, only differences from the foregoing embodiment are described in the modified embodiment.

In an embodiment, the value of w is indicated by a base station or determined according to one of the following: a discrete probability distribution; a transmission priority; or data information.

In an embodiment, at least one of the following information of the w sequences is determined by data information: sequence indication information; or a sequence number offset.

In an embodiment, the data information is an information bit or a codeword existing before modulation by a first communication node.

In an embodiment, the data information is an information bit existing before CRC attachment, a bit existing after CRC attachment and before channel coding, or a codeword existing after channel coding.

In an embodiment, the data information includes identifier information of the first communication node.

In an embodiment, a bit count of the data information is determined based on a value range of w, which is indicated by the data information.

In an embodiment, the data signal includes at least one of the following: value information of w; sequence number indication information; or a sequence number offset, and the data signal is determined based on the data information.

In an embodiment, the data information includes at least one of the following: one piece of value information of w; or w pieces of sequence indication information, which is used to indicate the w sequences.

In an embodiment, the data information includes at least one of the following: one piece of value information of w; or (w−1) sequence number offsets.

In an embodiment, when different first communication nodes take a same value of v, the data information includes v pieces of n-bit information, or when different first communication nodes take different values of v, the data information includes v pieces of n-bit information and value information of v; and an amount of non-repeated information in the v pieces of n-bit information is w. The non-repeated information in the v pieces of n-bit information is determined as the sequence number indication information, where n is a positive integer, and v is a positive integer greater than or equal to w for any first communication node.

In an embodiment, the data information includes: w pieces of n-bit information and one q-bit termination sequence, where a value of n is determined based on a quantity of sequences included in a sequence set which obtains the w sequences, q being a positive integer; and a quantity indicated by the first n bits of the termination sequence is w, and the w pieces of n-bit information indicate sequence number indication information of the w sequences.

In an embodiment, the apparatus further includes: a processing module configured to:

perform partial scrambling on the information bit existing before the CRC or the information bit existing after the CRC.

In an embodiment, the reference signal includes at least one of the following: a preamble; a pilot; or a DMRS.

In an embodiment, a generation module is configured to:

generate the reference signal by superimposing the w sequences; or generate the reference signal by mapping the w sequences to different time-frequency resources.

Figure 4:
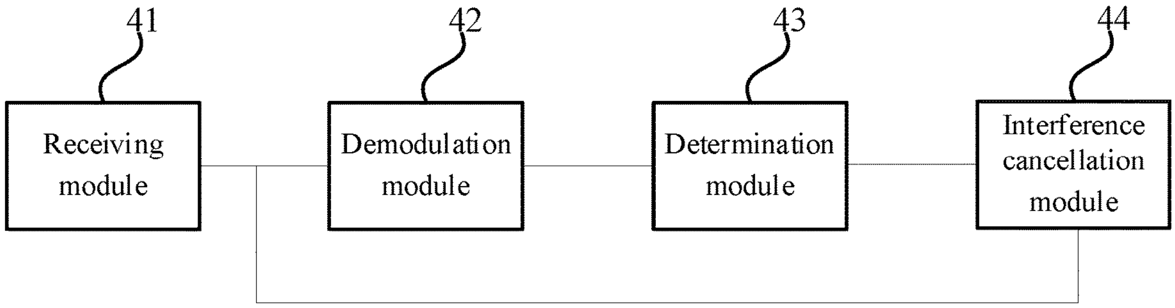
FIG. 4 is a schematic diagram of a reference signal processing apparatus provided by the present disclosure.

The present disclosure further provides a reference signal processing apparatus. FIG. 4 is a schematic diagram of a reference signal processing apparatus provided in the present disclosure. The apparatus is disposed in a second communication node. Referring to FIG. 4, the apparatus includes: a receiving module 41 configured to receive reference signals and data signals of multiple first communication nodes; a demodulation module 42 configured to perform demodulation, based on at least one sequence for generating a target reference signal in the reference signals, to obtain a data signal which corresponds to the target reference signal; a determination module 43 configured to determine to create w sequences for the target reference signal based on the data signal; and an interference cancellation module 44 configured to perform interference cancellation based on the w sequences, to determine a next target reference signal until cancellation is completed for all the reference signals.

The reference signal processing apparatus provided in this embodiment is configured to implement the reference signal processing method in the embodiment shown in FIG. 2. The implementation principle and technical effects of the reference signal processing apparatus provided in this embodiment are similar to those of the reference signal processing method in the embodiment shown in FIG. 2. Details are not described herein again.

On the basis of the foregoing embodiment, a modified embodiment of the foregoing embodiment is proposed. For simplified description, only differences from the foregoing embodiment are described in the modified embodiment.

In an embodiment, the apparatus further includes a sending module configured to send the value of w.

In an embodiment, the value of w is determined according to one of the following: a discrete probability distribution; a transmission priority; or data information.

In an embodiment, at least one of the following information of the w sequences is determined by data information: sequence indication information; or a sequence number offset.

In an embodiment, the data information is an information bit or a codeword existing before modulation by a first communication node.

In an embodiment, the data information is an information bit existing before CRC attachment, a bit existing after CRC attachment and before channel coding, or a codeword existing after channel coding.

In an embodiment, the data information includes identifier information of the first communication node.

In an embodiment, a bit count of the data information is determined based on a value range of w, which is indicated by the data information.

In an embodiment, the data signal includes at least one of the following: value information of w; sequence number indication information; or a sequence number offset, and the data signal is determined based on the data information.

In an embodiment, the data information includes at least one of the following: one piece of value information of w; or w pieces of sequence indication information, which is used to indicate the w sequences.

In an embodiment, the data information includes at least one of the following: one piece of value information of w; or (w−1) sequence number offsets.

In an embodiment, when different first communication nodes take a same value of v, the data information includes v pieces of n-bit information, or when different first communication nodes take different values of v, the data information includes v pieces of n-bit information and value information of v; and an amount of non-repeated information in the v pieces of n-bit information is w. The non-repeated information in the v pieces of n-bit information is determined as the sequence number indication information, where n is a positive integer, and v is a positive integer greater than or equal to w for any first communication node.

In an embodiment, the data information includes: w pieces of n-bit information and one q-bit termination sequence, where a value of n is determined based on a quantity of sequences included in a sequence set which obtains the w sequences, q being a positive integer; and a quantity indicated by the first n bits of the termination sequence is w, and the w pieces of n-bit information indicate sequence number indication information of the w sequences.

In an embodiment, partial scrambling is performed on the information bit existing before the CRC or the information bit existing after the CRC.

Figure 5:
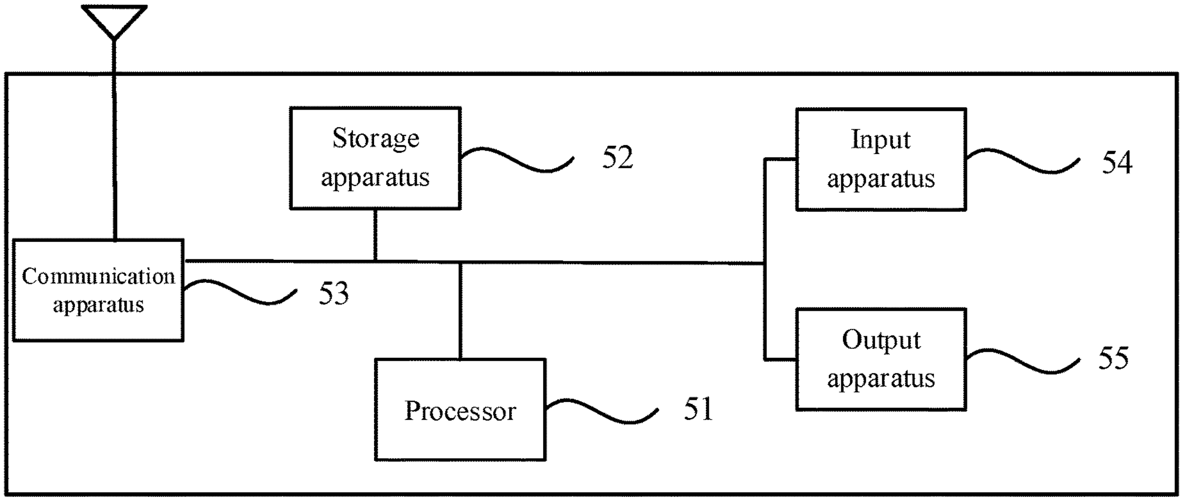
FIG. 5 is a schematic diagram of a first communication node provided by the present disclosure.

The present disclosure provides a first communication node, and FIG. 5 is a schematic diagram of the first communication node provided by the present disclosure. As shown in FIG. 5, the first communication node provided by the present disclosure includes at least one processor 51 and a storage apparatus 52. There may be one or more processors 51 in the first communication node, and one processor 51 is shown as an example in FIG. 5. The storage apparatus 52 is configured to store at least one program, where the at least one program, when executed by the at least one processor 51, causes the at least one processor 51 to implement the method according to the embodiment in FIG. 1 of the present disclosure.

The first communication node further includes: a communications apparatus 53, an input apparatus 54 and an output apparatus 55.

The processor 51, the storage apparatus 52, the communication apparatus 53, the input apparatus 54 and an output apparatus 55 in the first communication node may be connected by a bus or by other means. In FIG. 5, the connection is realized by a bus as an example.

The input apparatus 54 may be configured to receive an input numerical digit or character information and generate a keying signal input related to user settings and function control of the first communication node. The output apparatus 55 may include a display device such as a display screen.

The communications apparatus 53 may include a receiver and a transmitter. The communications apparatus 53 is configured to transmit and receive information according to control of the processor 51. The information includes, but is not limited to, a reference signal and a corresponding data symbol.

As a computer-readable storage medium, the storage apparatus 52 may be configured to store a software program, a computer-executable program and a module, for example, program instructions/modules (such as the creation module 31, the generation module 32 and the sending module 33 in the reference signal processing apparatus) corresponding to the method according to the embodiment in FIG. 1 of the present disclosure. The storage apparatus 52 may include a storage program area and a storage data area, where the storage program area may store an operating system and application program(s) required by at least one function, and the storage data area may store data created according to the use of the first communication node, etc. In addition, the storage apparatus 52 may include a high-speed random access memory and a non-volatile memory, for example, at least one magnetic disk storage device, a flash memory device, or another non-volatile solid-state storage device. In some examples, the storage apparatus 52 may include memories remotely located with respect to the processor 51, and these remote memories may be connected to the first communication node via a network. Examples of the above-mentioned network include the Internet, an intranet, a local area network, a mobile communication network, and a combination thereof.

Figure 6:
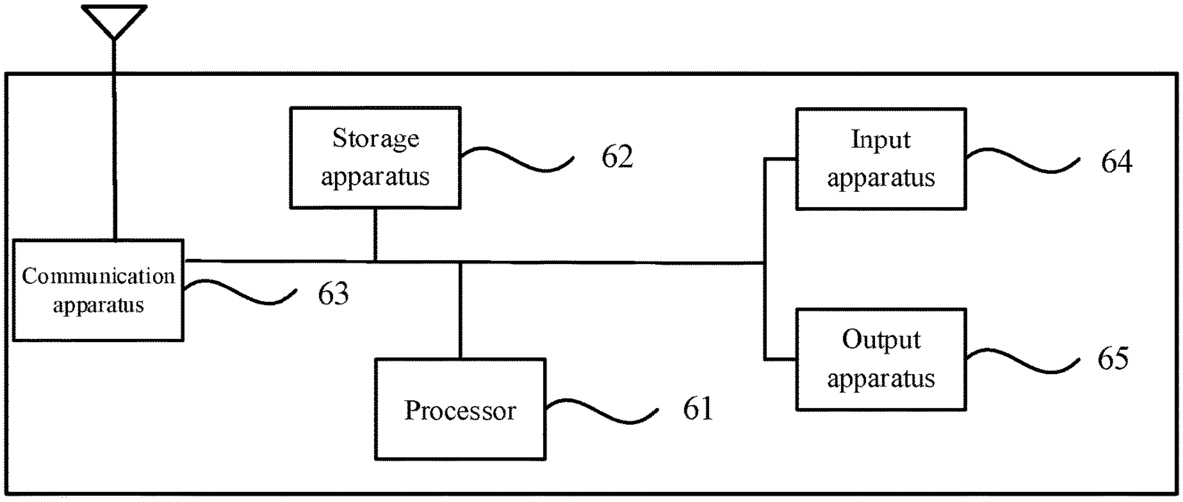
FIG. 6 is a schematic diagram of a second communication node provided by the present disclosure.

A further embodiment of the present disclosure provides a second communication node, and FIG. 6 is a schematic diagram of the second communication node provided by the present disclosure. As shown in FIG. 6, the second communication node provided by the present disclosure includes at least one processor 61 and a storage apparatus 62. There may be one or more processors 61 in the second communication node, and one processor 61 is shown as an example in FIG. 6. The storage apparatus 62 is configured to store at least one program, where the at least one program, when executed by the at least one processor 61, causes the at least one processor 61 to implement the reference signal processing method according to the embodiment in FIG. 2 of the present disclosure.

The second communication node further includes: a communications apparatus 63, an input apparatus 64 and an output apparatus 65.

The processor 61, the storage apparatus 62, the communication apparatus 63, the input apparatus 64 and an output apparatus 65 in the second communication node may be connected by a bus or by other means. In FIG. 6, the connection is realized by a bus as an example.

The input apparatus 64 may be configured to receive an input numerical digit or character information and generate a keying signal input related to user settings and function control of the second communication node. The output apparatus 65 may include a display device such as a display screen.

The communications apparatus 63 may include a receiver and a transmitter. The communications apparatus 63 is configured to transmit and receive information according to control of the processor 61. The information includes, but is not limited to, a reference signal and a corresponding data symbol.

As a computer-readable storage medium, the storage apparatus 62 may be configured to store a software program, a computer-executable program and a module, for example, program instructions/modules (such as the receiving module 41, the demodulation module 42, the determination module 43, and the interference cancellation module 44 in the reference signal processing apparatus) corresponding to the reference signal processing method according to the embodiment in FIG. 2 of the present disclosure. The storage apparatus 62 may include a storage program area and a storage data area, where the storage program area may store an operating system and application program(s) required by at least one function, and the storage data area may store data created according to the use of the second communication node, etc. In addition, the storage apparatus 62 may include a high-speed random access memory and a non-volatile memory, for example, at least one magnetic disk storage device, a flash memory device, or another non-volatile solid-state storage device. In some examples, the storage apparatus 62 may include memories remotely located with respect to the processor 61, and these remote memories may be connected to the second communication node via a network. Examples of the above-mentioned network include the Internet, an intranet, a local area network, a mobile communication network, and a combination thereof.

A further embodiment of the present disclosure provides a storage medium storing a computer program which, when executed by a processor, causes the processor to implement the reference signal processing method according to any of the embodiments of the present disclosure, for example, the reference signal processing method applied to a first communication node and the reference signal processing method applied to a second communication node. The reference signal processing method applied to the first communication node includes: creating w sequences, where different first communication nodes do not all take a same value of w; generating a reference signal based on the w sequences; and sending the reference signal and a corresponding data signal.

The reference signal processing method applied to the second communication node includes: receiving reference signals and data signals of multiple first communication nodes; performing demodulation, based on at least one sequence for generating a target reference signal in the reference signals, to obtain a data signal which corresponds to the target reference signal; and determining to create w sequences for the target reference signal based on the data signal.

The computer storage medium of this embodiment may be any combination of one or more computer-readable media. The computer-readable medium may be a computer-readable signal medium or a computer-readable storage medium. For example, the computer-readable storage medium may be, but is not limited to, electrical, magnetic, optical, electromagnetic, infrared, or semiconductor system, an apparatus or a device, or any combination thereof. Examples of the computer-readable storage medium (a non-exhaustive list) include: an electrical connection with one or more wires, a portable computer disk, a hard disk, a Random Access Memory (RAM), a Read-Only Memory (ROM), an erasable programmable read-only memory, EPROM), a flash memory, an optical fiber, a Compact Disc Read-Only Memory (CD-ROM), an optical storage device, a magnetic storage device or any proper combination thereof. The computer-readable storage medium may be any tangible medium including or storing a program, and the program may be used by or used in combination with an instruction execution system, apparatus or device.

The computer-readable signal medium may include a data signal propagated in a baseband or propagated as a part of a carrier, and carries computer-readable program code. Such a propagated data signal may be in multiple forms, including but not limited to: an electromagnetic signal, an optical signal, or any proper combination thereof. The computer-readable signal medium may alternatively be any computer-readable storage medium other than the computer-readable medium. The computer-readable storage medium may send, propagate or transmit a program used by or used in combination with an instruction execution system, apparatus or device.

The program code included in the computer-readable medium may be transmitted by any suitable medium, including but not limited to: radio, an electric cable, an optical-fiber cable, Radio Frequency (RF), or any proper combination thereof.

Computer program code for executing the operations in the present disclosure may be compiled by using one or more program design languages or a combination thereof. The programming languages include object oriented programming languages, such as Java, Smalltalk, and C++, and conventional procedural programming languages, such as C or similar programming languages. The program code can be executed fully on a user computer, executed partially on a user computer, executed as an independent software package, executed partially on a user computer and partially on a remote computer, or executed fully on a remote computer or a server. In a circumstance in which a remote computer is involved, the remote computer may be connected to a user computer via any type of network, including a Local Area Network (LAN) or a Wide Area Network (WAN), or may be connected to an external computer (for example, connected via the Internet by using an Internet service provider).

The term "user equipment" covers any suitable type of wireless user equipment, such as mobile phones, portable data processing equipment, portable web browsers or vehicle-mounted mobile stations.

Generally speaking, various embodiments of the present disclosure can be implemented in hardware or dedicated circuits, software, logic or any combination thereof. For example, some aspects can be implemented in hardware, while other aspects can be implemented in firmware or software that can be executed by a controller, a microprocessor or another computing device. However, the present disclosure is not limited thereto.

Embodiments of the present disclosure can be implemented by a data processor of a mobile device executing computer program instructions, for example, in a processor entity, or by hardware, or by a combination of software and hardware. The computer program instructions may be assembly instructions, Instruction Set Architecture (ISA) instructions, machine instructions, machine-related instructions, microcode, firmware instructions, state setting data or source code or object code written in any combination of one or more programming languages.

The block diagram of any logic process in the drawings of the present disclosure can represent program steps, or can represent interconnected logic circuits, modules and functions, or can represent a combination of program steps and logic circuits, modules and functions. The computer program may be stored in a memory. The memory may be of any type that is suitable for a local technical environment and can be implemented using any suitable data storage technology, for example but not limited to, a read-only memory (ROM), a random-access memory (RAM), optical storage devices and systems (a digital versatile disk (DVD) or a compact disk (CD)). The computer-readable medium may include a non-transitory storage medium. The data processor may be any type suitable for the local technical environment, for example but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

The invention claimed is:

1. A reference signal processing method performed by a first communication node, comprising:

selecting w sequences from a sequence pool, wherein quantities w for different first communication nodes are not all the same, and w is a positive integer;

generating a reference signal based on the w sequences, the reference signal carrying the w sequences; and sending the reference signal and a data signal which corresponds to the reference signal;

wherein the data signal comprises at least one of:

value information of w;

sequence number indication information; or a sequence number offset, and the data signal is determined based on data information.

2. The method of claim 1, wherein:

the value of w is indicated by a base station or determined according to one of: a discrete probability distribution; a transmission priority; or data information; or at least one of the following information of the w sequences is determined by data information:

sequence indication information; or a sequence number offset.

3. The method of claim 2, wherein the data information is an information bit or a codeword existing before modulation by the first communication node.

4. The method of claim 3, wherein the data information is an information bit existing before cyclic redundancy check attachment, a bit existing after CRC attachment and before channel coding, or a codeword existing after channel coding.

5. The method of claim 2, wherein the data information comprises identifier information of the first communication node.

6. The method of claim 2, wherein a bit count of the data information is determined based on a value range of w, which is indicated by the data information.

7. The method of claim 2, wherein:

the data information comprises at least one of:

one piece of value information of w; or w pieces of sequence indication information, which is used to indicate the w sequences.

8. The method of claim 2, wherein:

the data information comprises at least one of:

one piece of value information of w; or (w−1) sequence number offsets.

9. The method of claim 2, wherein:

when the different first communication nodes take a same value of v, the data information comprises v pieces of n-bit information, or when the different first communication nodes take different values of v, the data information comprises v pieces of n-bit information and value information of v;

an amount of non-repeated information in the v pieces of n-bit information is w;

the non-repeated information in the v pieces of n-bit information is determined as the sequence number indication information; and n is a positive integer, and v is a positive integer greater than or equal to w for any first communication node.

10. The method of claim 2, wherein:

the data information comprises:

w pieces of n-bit information and one q-bit termination sequence, wherein a value of n is determined based on a quantity of sequences comprised in a sequence set which obtains the w sequences, q being a positive integer; and a quantity indicated by the first n bits of the termination sequence is w, and the w pieces of n-bit information indicate sequence number indication information of the w sequences.

11. The method of claim 4, further comprising:

performing partial scrambling on the information bit existing before the CRC or the information bit existing after the CRC.

12. The method of claim 1, wherein the reference signal comprises at least one of:

a preamble;

a pilot; or a demodulation reference signal (DMRS).

13. The method of claim 1, wherein generating a reference signal based on the w sequence comprises:

generating the reference signal by superimposing the w sequences; or generating the reference signal by mapping the w sequences to different time-frequency resources.

14. A reference signal processing method applied to a second communication node, comprising:

receiving reference signals and data signals of multiple first communication nodes;

performing demodulation, based on at least one sequence for generating a target reference signal in the reference signals for the multiple first communication nodes, to obtain a data signal in the data signals for the multiple first communication nodes, which corresponds to the target reference signal;

determining to create w sequences for the target reference signal based on the data signal which corresponds to the target reference signal; wherein the w sequences are created by the respective first communication node, and different first communication nodes do not all take a same value of w, and wherein w is a positive integer; and performing interference cancellation based on the w sequences, to determine a next target reference signal until interference cancellation is performed on all the reference signals for the multiple first communication nodes.

15. A first communication node, comprising:

at least one processor; and a storage apparatus, configured to store at least one program, wherein:

the at least one program, when executed by the at least one processor, causes the at least one processor to implement the reference signal processing method of claim 1.

16. A second communication node, comprising:

at least one processor; and a storage apparatus, configured to store at least one program, wherein the at least one program, when executed by the at least one processor, causes the at least one processor to implement the reference signal processing method of claim 14.

17. A non-transitory computer-readable storage medium storing a computer program which, when executed by a processor, implements the reference signal processing method of claim 1.

18. A non-transitory computer-readable storage medium storing a computer program which, when executed by a processor, implements the reference signal processing method of claim 14.

* * * * *